US012811898B1

(12) United States Patent
Chen et al.

(10) Patent No.: US 12,811,898 B1
(45) Date of Patent: Nov. 24, 2026

(54) MULTI-PLATFORM CHAT ASSISTANT

(71) Applicant: Zoom Video Communications, Inc, San Jose, CA (US)

(72) Inventors: Jingjing Chen, Hefei (CN); Qiumin Dong, Suzhou (CN); Lin Han, Los Altos, CA (US); Dingping Jiang, Hefei (CN); Chen Li, Suzhou (CN); He Li, Suzhou (CN); Yike Liu, Santa Clara, CA (US); Gang Liu, Hefei (CN); Ying Lu, Carritos, CA (US); Jiaming Mao, Hefei (CN); Kai Ni, Sammamish, WA (US); Xudong Ruan, Hefei (CN); Wang Tian, Hefei (CN); Chao Wang, Hefei (CN); Tianchi Xu, Long Island, NY (US); Qixin Xu, Hefei (CN); Chenyang Xiang, Hefei (CN); Yingying Zhang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/385,118

(22) Filed: Oct. 30, 2023

(51) Int. Cl.
*H04L 51/02* (2022.01)

(52) U.S. Cl.
CPC .................................... *H04L 51/02* (2013.01)

(58) Field of Classification Search
CPC ....................................................... H04L 51/02
See application file for complete search history.

(56) References Cited

U.S. PATENT DOCUMENTS

| | | | | |
|---|---|---|---|---|
| 2018/0357286 | A1* | 12/2018 | Wang | G06F 16/3329 |
| 2021/0288926 | A1* | 9/2021 | Golding | G10L 15/22 |
| 2024/0403302 | A1* | 12/2024 | Sheward | G06F 16/24575 |
| 2024/0403567 | A1* | 12/2024 | Dressler, II | H04L 51/02 |

* cited by examiner

*Primary Examiner* — Soe Hlaing
(74) *Attorney, Agent, or Firm* — Kilpatrick Townsend & Stockton LLP

(57) ABSTRACT

One example method includes receiving, by a communications provider via a chat assistant, an assistant request comprising a request phrase from a first client device; determining, by the chat assistant, one or more user-based vectors based on the first client device; determining, by the chat assistant, one or more request vectors based on the request phrase and the one or more user-based vectors; determining, by the chat assistant, one or more response contents based on the one or more request vectors and the one or more user-based vectors; generating, by the chat assistant, a response prompt comprising one or more of the response contents; and transmitting, by the chat assistant via the communications provider to the first client device, the response prompt.

20 Claims, 9 Drawing Sheets

MULTI-PLATFORM CHAT ASSISTANT

FIELD

The present application generally relates to chat assistants, and more particularly relates to chat assistants that utilize user-based information and resources across multiple platform to generate swift and accurate responses to assistant requests.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
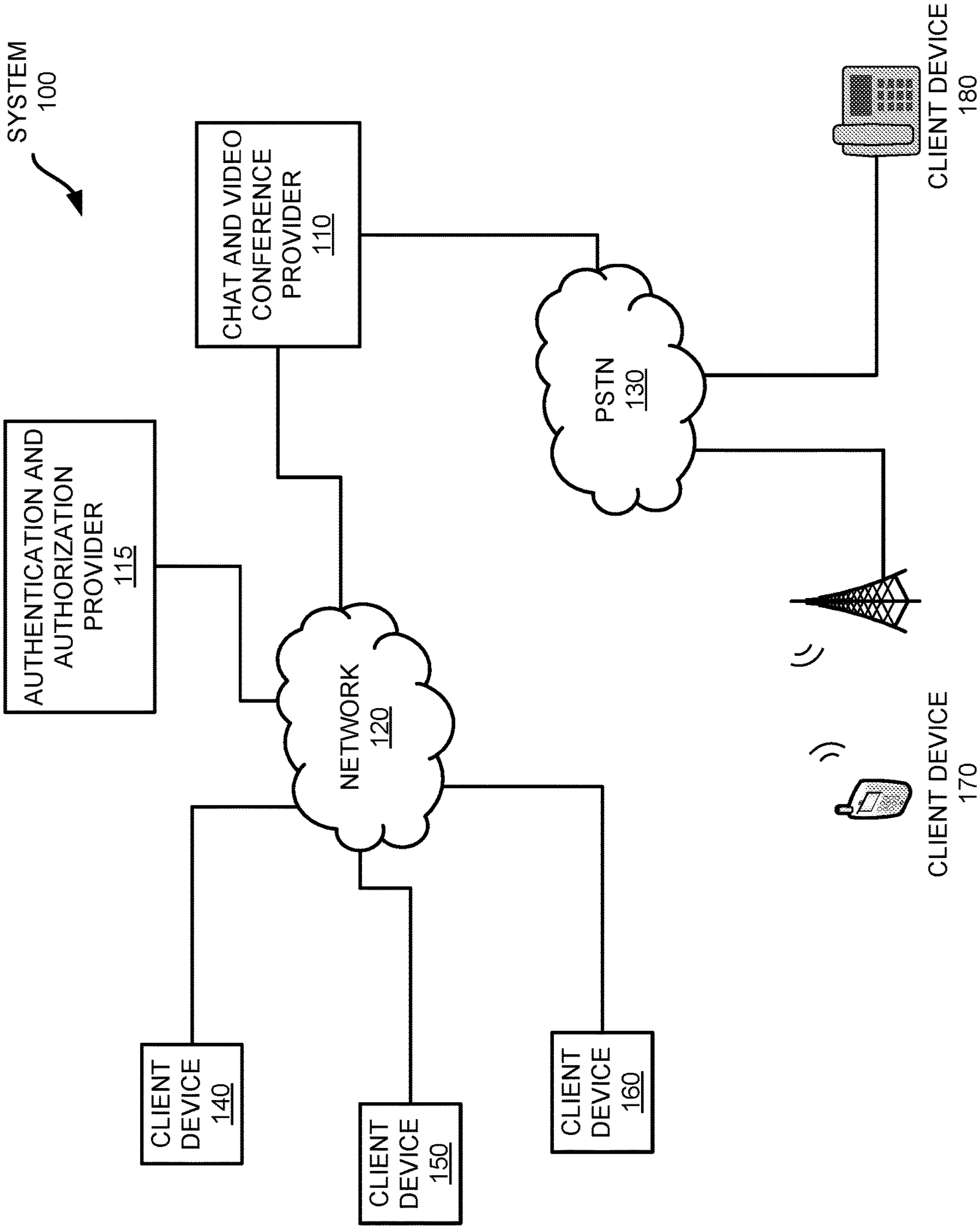
FIGS. 1 and 2 show example systems for providing a multi-platform chat assistant (hereinafter "chat assistant"), according to an embodiment herein.

Examples are described herein in the context of systems and methods for providing chat assistant functionalities within a communications platform. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Communication platforms have become a fixture of modern communication. For example, chat messaging, email correspondence, and virtual conferencing are commonly used means for both personal and professional communication. As these communication platforms are increasingly relied upon as a communication means, they are also utilized as information repositories. For example, a project name may be discussed during a chat messaging session. Afterwards, a user may not immediately remember the project name or details involved in the project. To gather that information, the user may return to the chat messaging session to review the project name and related details. Similarly, during a virtual conference, a keynote speaker may present. After the virtual conference terminates, a user may not remember the name of the keynote speaker. To find the keynote speaker's name, the user may review the meeting invite or transcription generated during the virtual conference to find the keynote speaker's name. These forms of searching, however, still require a user to recall certain types of information in order to find the sought-after information (e.g., which chat messaging session the project was discussed in or what virtual conference the keynote speaker was part of). Not only does this traditional form of searching require a user to recall requisite information to find a desired search result, the accuracy of this form of searching often declines over time (e.g., the farther away a user is in time from the virtual conference, the less likely the user is to recall which virtual conference the keynote speaker was involved in).

Moreover, these types of searching are time consuming and can be impossible for a user if he or she does not know where to start searching for the sought-after information. For example, if a designer is trying to determine whether the error icon is circular or triangular, the designer using conventional techniques may have to ask a colleague, sift through chat channel histories, or perform a traditional search of an application, including filtering through the results to find relevant responses. All of these conventional techniques require extensive input from the searching user and thus can be time consuming to identify the sought-after information. Additionally, if the searching user does not know where to start looking for the sought-after information, finding the sought-after information may be difficult or impossible.

To address the above shortcomings of traditional searches, example multi-platform chat assistants are provided herein. A multi-platform chat assistant (hereinafter the "chat assistant") may identify sought-after information and generate an accurate reply based on an assistant request made by a searching user. For example, a user may input the question "what does the error icon look like?" or "presenter's name from last month's Annex meeting?" as an assistant request for the chat assistant. The chat assistant may generate and provide an accurate response to the question by reading relevant chat channels and documents based on the requesting user. The chat assistant may be a multi-platform chat assistant meaning that the chat assistant may access, parse, and extract content across multiple different (e.g., separate) data repositories to search for response contents to an assistant request. In some embodiments, the response generated by the chat assistant may include links to the relevant text within a chat channel or may include a suggested contact that may be a useful response for answering the request.

A benefit of the chat assistant over conventional assistants or searches is the that the generated response can be tailored to a user and background information associated with the user can be used to fill in any information that is lacking from the assistant request. This can allow the chat assistant to generate a response that is accurate despite a user recalling minimal information in the assistant request. For example, by utilizing background information associated with the user, the chat assistant can readily identify relevant resources in which response content may be located. This can improve the overall accuracy of the chat assistant responses.

As will be described in greater detail below, the chat assistant can provide an improved assistant functionality by increasing the accuracy and speed of identifying response contents by leveraging user-based information when generating responses to an assistant request.

This illustrative example is given to introduce the reader to the general subject matter discussed herein and the disclosure is not limited to this example. The following sections describe various additional non-limiting examples and examples of systems and methods for providing chat assistant functionality within a communications platform.

As noted above, in one example, the chat assistant functionality may be used to find and prepare a response based on content within a communications platform. For ease of discussion, the following discussion relates to a communications platform for virtual conferencing. Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
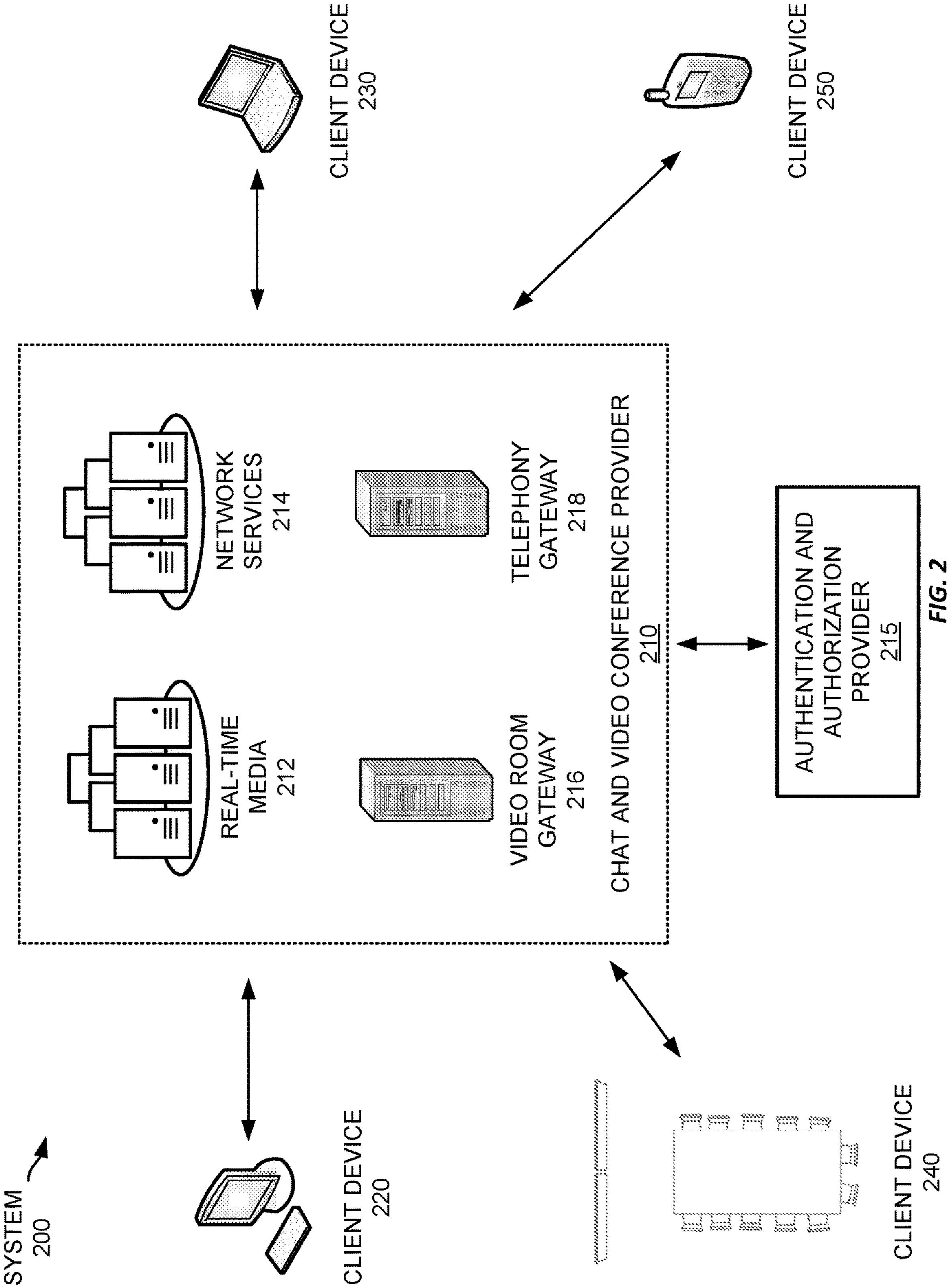

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality describe above, the chat and video conference provider 210 (or the chat and video conference provider 110) may provide one or more communication functionality, such as for example a chat messaging functionality or calendar functionality. In the example of a chat messaging functionality, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210. The chat functionality may be described in greater detail with respect to FIG. 6.

In some embodiments, the communications provider may provide one or more communications functionality. For example, the chat and video conference provider 210 (or the chat and video conference provider 110) may host or provide one or more of a video conferencing functionality, a chat messaging functionality, an email functionality, a calendar/scheduling functionality, and a document sharing functionality. As noted above, in addition to being a means for communication, these communication functionalities are increasingly being relied upon by users as information repositories. As users begin to rely on these communication functionalities as information repositories, the issue arises of finding the location of the sought-after information. For example, a project may be discussed via the chat messaging functionality of a chat channel, however, a user may not recall which chat channel the project was discussed in. If a user is in multiple chat channels, the user may have difficulty finding the sought-after information. Moreover, parsing the multitude of content spread across the various platforms provided by the communications provider, along with third-party platforms used in conjunction with the communication provider can be time intensive, and in some cases, completely impossible.

Figure 3:
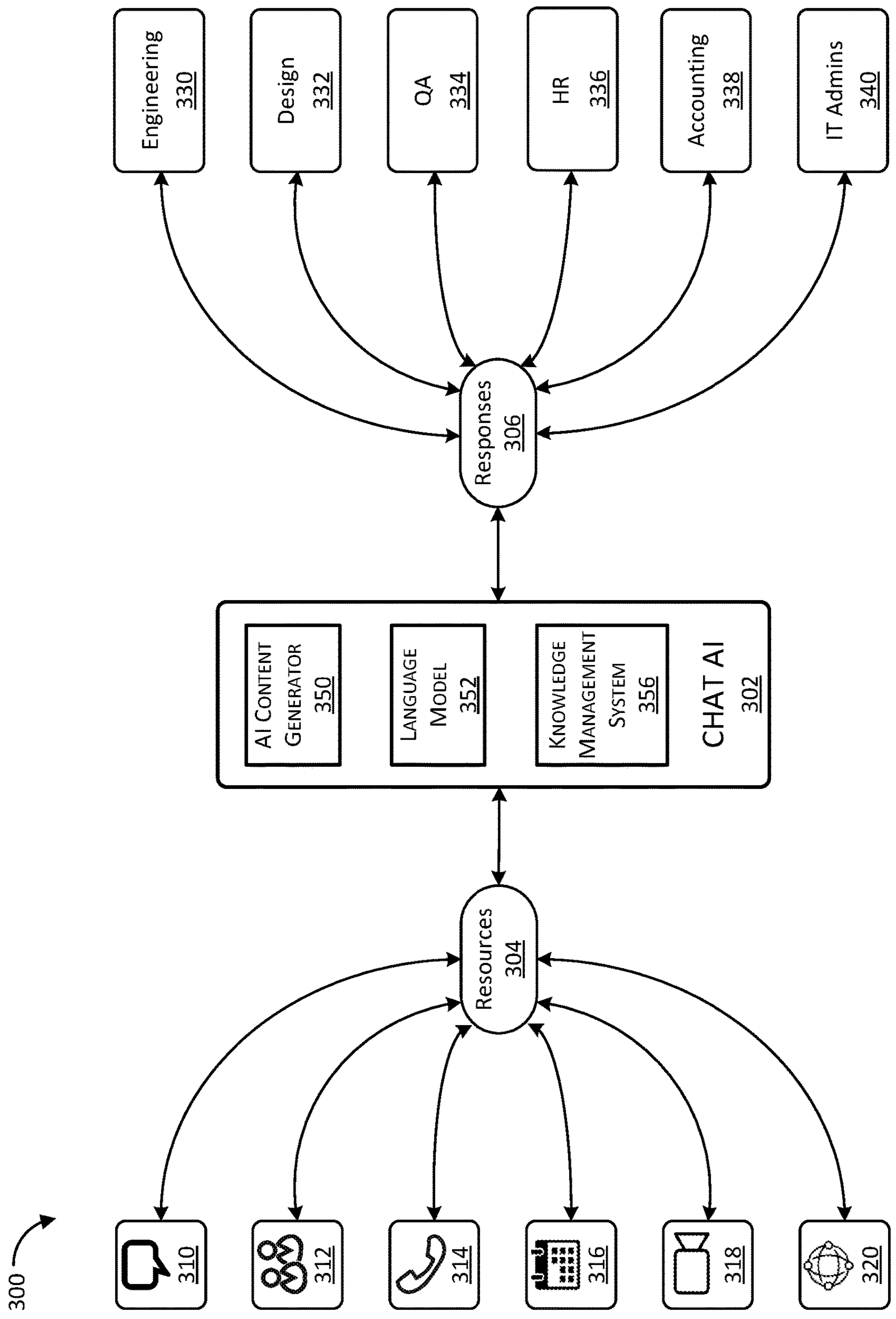
FIG. 3 illustrates a high-level overview of a system of the chat assistant functionality, according to an embodiment herein.

To assists users in quickly and efficiently finding content and answers to questions across one or more platforms, applications, or forums, the chat and video conference provider 210 may provide a chat assistant, as described herein. Referring now to FIG. 3, FIG. 3 illustrates a high-level overview of a chat assistant functionality 300, as provided herein. As illustrated, the chat assistant functionality 300 may include a chat assistant 302. The chat assistant 302 may include an artificial intelligence (AI) content generator 350, a language model 352, and a knowledge management system 356. The chat assistant 302, including the language model 352 and the knowledge management system 356, are discussed in greater detail with respect to FIG. 4.

The chat assistant 302 may receive an assistant request from a client device (not shown). To prepare a response to the assistant request, the chat assistant 302 may identify response contents. Response contents may include chat channel content (e.g., messages), emails, meetings, documents, contacts, webpages, and the like. To identify response contents, the chat assistant 302 may identify one or more resources 304 and parse the response contents within the resources 304. That is, the chat assistant 302 may extract and process response contents, such as text and images, within the resources 304. This is because, the resources 304 may include relevant information for generating a response to the assistant request. As illustrated, the resources 304 may include or gather response contents from one or more applications or platforms 310, 312, 314, 316, 318, and 320. In the illustrated example, a resource may be a chat channel 310, a contact list 312, a phone application 314, a calendar 316, a video conferencing application 318, or a third-party application 320.

In some embodiments, the chat assistant 302 may identify and access one or more of the resources 304 based on the assistant request submitted by a client device. For example, upon receiving the assistant request, the chat assistant 302 may determine one or more user-based vectors associated with the client device. For example, a user may login using the client device and the user-based vectors may be associated with the user's login profile. Example user-based vectors include information relating to the requesting user such as a location associated with the requesting user, a job title or position of the user, projects associated with the user, channels or documents the user recently or often frequents, an organization associated with the user, a group associated with the user, a contact associated with the user, a physical location of the first client device, and in some cases a previous assistant request associated with the requesting user.

In some embodiments, the chat assistant 302 may identify and access the resources 304 based on information in the assistant request. For example, the chat assistant 302 may identify a request vector from the assistant request, such as the name of a project. A request vector may be or include information relating to the sought-after content, such as a topic, file name, contact, and the like. Once the user-based vector(s) and the response vector(s) are determined by the chat assistant 302, the chat assistant 302 may then determine which resource 304 to parse for the requested information. For example, the chat assistant 302 may then identify a chat channel 310 that the requesting user frequents often as one of the user-based vectors. Then, the chat assistant 302 may search content within the chat channel 310 for response contents, such as text, threads, or documents, that relate to a topic (e.g., the request vector) identified in the assistant request.

As will be described in greater detail with respect to FIG. 4, the chat assistant 302 may read through documents, text, files, and images to extract response contents. For example, a hiring manager may submit an assistant request for the chat assistant 302 to identify candidates who have 4-years' experience and can speak Mandarin from the resumes received responsive to a job posting. Based on this assistant request, the chat assistant 302 may query the one or more resources 304 to identify resumes (response contents) that include the requested information. The chat assistant 302 may use the language model 352 to parse the resumes to identify the requested information. In some embodiments, the chat assistant 302 may process the content of the resources 304 using an indexing service for faster retrieval of response contents.

Once the response contents is identified, the chat assistant 302 may generate one or more responses 306. The chat assistant 302 may use the AI content generator 350 and/or the language model 352 to generate the response(s) 306. The AI content generator 350 and/or the language model 352 may generate the response(s) 306 based on the response contents identified from the resource(s) 304. In some embodiments, the chat assistant 302 may index and store the response 306 in a knowledge management system 356 for future reference. For example, the chat assistant 302 may associate or bind a response 306 with a specific communications medium, such that if a similar assistant request is received, the response 306 can be readily provided.

Once the response 306 is generated, the chat assistant 302 may transmit the response(s) 306 to the respective communications medium. For example, if the assistant request was transmitted via a Questions and Answers (Q&A) forum, then the response 306 may be provided on the Q&A forum. As noted above, in such a case the response 306 may be associated with the assistant request submitted on the Q&A forum. Communications medium may include a variety of categories, varying in content, application, mode, and forum. In some embodiments, such as the illustrated example, the communications medium may be a chat channel based on topic. For example, an engineering chat channel 330, a design chat channel 332, a Q&A chat channel 334, a HR chat channel 336, an accounting chat channel 338, and an IT Administration chat channel 340. As would be understood by those skilled in the art, the communications medium could be a text message, a phone call, an email, or an individual prompt to the chat assistant 302.

Figure 4:
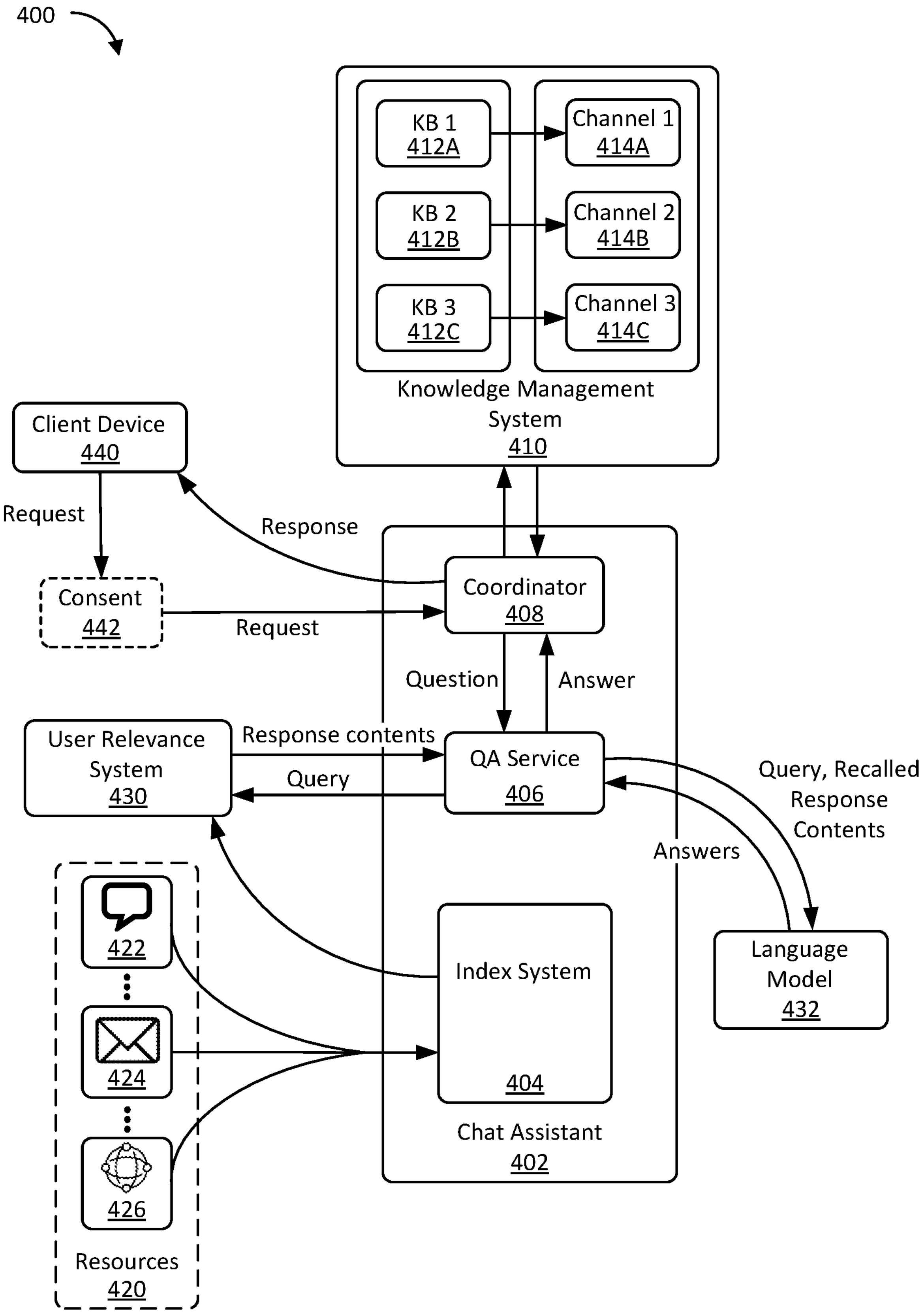
FIG. 4 illustrates an example chat assistant, according to an embodiment herein.

Referring now to FIG. 4, an example chat assistant functionality 400 is illustrated. As noted above, FIG. 4 provides a more detailed example of the chat assistant functionality 300 as described with respect to FIG. 3. As illustrated, the chat assistant functionality 400 may include a chat assistant 402. The chat assistant 402 may include an index system 404, a Questions and Answers (QA) service 406, and a coordinator 408, each of which is described in greater detail below.

The chat assistant 402 may receive an assistant request ("request") from a client device 440. The client device 440 may be the same or similar to the client device 140, as described above. The request may be received by the chat assistant 402 via a communications medium, such as through a chat channel, a text message, a chat assistant functionality application, a webpage, or a chat bot. For ease of discussion, the remaining application will focus on the embodiment in which the request is submitted via a chat channel.

In some embodiments, as part of submitting the request to the chat assistant 402, the client device 440 may first provide consent 442 for the chat assistant functionality 400. That is, the client device 440 may be prompted to provide consent 442 for using the chat assistant 402. As would be appreciated by those skilled in the art, consent 442 may allow the chat assistant 402, and functions therein, to use one or more aspects of the request to generate responses for the client device 440, and in some embodiments, for generation of responses for future chat assistant requests. Aspects may include using information from a user's profile or a profile associated with the client device 440 for generation of the responses. The consent 442 may provide the chat assistant 402 authorization to use data gathered during the chat assistant request as part of a neural network training or machine learning process. For example, answers generated by the language model 432 may be used as part of a training process of the chat assistant 402. The consent 442 may be for one or more functions or components of the chat assistant functionality 400, or for all functions or components of the chat assistant functionality 400.

The request from the client device 440 may be received by a coordinator 408 of the chat assistant 402. The coordinator 408 may determine whether the request is related to a previous request or is a new request. That is, the coordinator 408 may determine whether there is an associated response already prepared for the request. For example, the coordinator 408 may communicate with a knowledge management system 410, such as the knowledge management system 356, to determine whether there is an associated response.

The knowledge management system 410 may be or include content management applications for collecting, storing, and/or accessing responses to requests. For example, the knowledge management system 410 may include a plurality of knowledge bases (KB) 412A, 412B, and 412C. Each of the knowledge bases 412A-412C may store responses corresponding to a specific category, topic, or content. For example, in the illustrated example, each of the knowledge bases 412A, 412B, and 412C may store responses that correspond to requests associated with a specific chat channel 414A, 414B, and 414C. That is, the knowledge management system 410 may bind or otherwise associate the knowledge base 412A with the chat channel 414A. This may allow for easy identification and access to responses that are associated with the chat channel 414A. For example, if the chat channel 414A is a Questions and Answers (Q&A) chat channel, then the knowledge management system 410 can determine whether the response submitted by the client device 440 is similar or corresponds to a previously submitted response associated with the chat channel 414A. If the request is similar to a previously submitted response associated with the chat channel 414A, the knowledge management system 410 can determine the associated response in the knowledge base 412A and provide the response to the coordinator 408. In this manner, the chat assistant 402 can quickly and efficiently provide a response to the client device 440 to the submitted request.

As those skilled in the art will readily appreciate, the knowledge management system 410 may be an application or platform that is hosted by a third party or by a communications provider, such as the chat and video conference provider 110.

Prior to determining whether there is a related or corresponding answer within the knowledge management system 410, the chat assistant 402 may determine one or more user-based vectors associated with the request. In some embodiments, a user relevance system 430 may determine the user-based vectors associated with the request. To determine the user-based vectors, the coordinator 408 may transmit the request as a question to a QA service 406. The QA service 406 may be an intermediary service between the question received by the coordinator 408 and generation of an answer to the question. That is, the QA service 406 may transmit the question to the user relevance system 430 for determination of the user-based vectors. In some embodiments, the QA service 406 may determine one or more of the request vectors to provide context or bounds for the user relevance system 430 in determination of the user-based vectors. In other embodiments, the QA service 406 may determine one or more of the user-based vectors to provide context or bounds for the user relevance system 430. Although the illustrated example shows the user relevance system 430 as external to the chat assistant 402, it should be understood that in some embodiments, the user relevance system 430 is part of the chat assistant 402.

As noted above, a user-based vector may be information relating to the client device 440, such as a location (e.g., an office location), an organization, a job title or position of a user associated with the client device 440, a group or chat channel frequented by or associated with the client device 440, a contact, a physical location of the client device 440, and the like. In some embodiments, the user relevance system 430 may determine that the client device 440 frequently edits or works within a specific document or on files relating to a specific project. In some embodiments, the user-based vector may include a previous request submitted by the client device 440. In such cases, the coordinator 408 may communicate with the knowledge management system 410 to determine the previous response associated with the previous request.

In some embodiments, to generate or identify a response to the request, the chat assistant 402 may determine one or more request vectors based on the request. As is illustrated, in some embodiments, the QA service 406 may determine the request vectors associated with the request. The request may include a request phrase specifying the sought-after information. For example, the request phrase may be "what does the error icon look like?" Based on this request phrase, the chat assistant 402 may determine that the client device 440 is looking for information on the "error icon." Specifically, that the client device 440 is requesting information on the "look" of the "error icon."

In some embodiments, the chat assistant 402 may determine one or more of the request vectors based on one or more of the user-based vectors. For example, a user-based vector may be a job title of the user associated with the client device 440. The chat assistant 402 may determine that the user is a designer or engineer. Thus, based on this user-based vector, the chat assistant 402 may determine a request vector of "designer" or "engineer" to limit the search of an "error icon" to icons associated with designers or engineers. In other words, the chat assistant 402 may limit the request vector "error icon" to "error icons used by designers and/or engineers."

Once the user-based vectors and the response vectors are determined by the chat assistant 402, the user relevance system 430 may determine one or more response contents. As noted above, response contents include content to be included in or used to generate a response to the request. Following the above example, a response content to the request "what does the error icon look like?" may be a jpg file illustrating an error icon or a response content may be a contact within the design team who may have information relating to which error icon the design team uses.

As described with respect to FIG. 3, the response contents may be collected or gathered from resources across multiple platforms and/or applications. For example, as illustrated, the chat assistant 402 may include the index system 404. The index system 404 may gather response contents from a plurality of resources 420. The resources 420 may include chat channels 422, email messages 424, and third-party applications 426. The index system 404 may extract content from each of the resources 420 and index the content. Then, the index system 404 may share some or all of the indexed content from the resources 420 with the user relevance system 430. In some embodiments, the user relevance system 430 may query the index system 404 for indexed content relating to a specific topic, however, in other embodiments, the index system 404 may simply push indexed content to the user relevance system 430 which may in turn store the content based on user-based vectors. That is, the index system 430 may extract and index content from a design chat channel and share it with the user relevance system 430. The user relevance system 430 may then store the indexed content from the design chat channel and associate the indexed content with the design chat channel user-based vector. Thus, when a user-based vector including the design chat channel is determined, the user relevance system 430 may readily access the indexed content associated with the design chat channel for response contents relating to a given request vector.

To determine response contents, the user relevance system 430 may determine multiple response contents based on the request vectors and the user-based vectors, as described above. In some embodiments, the user relevance system 430 may determine a relevancy of each of the response contents to the client device 440 based on the user-based vectors. For example, the user relevance system 430 may determine five error icons (response contents) used across different teams and projects within an organization. Based on the user-based vector of the requesting user being a designer, the user relevance system 430 may determine three of the error icons (response contents) to be of lower relevance to the requesting user because they relate to the marketing and drafting teams. In contrast, the user relevance system 430 may determine that the remaining two error icons (response contents) to be of higher relevance to the requesting user because they are used or discussed within the design team chat channel and relating files. Finally, the user relevance system 430 may determine that one of the error icons (response contents) to be most relevant to the requesting user because this error icon is used most commonly within files edited by the requesting user. Based on the assigned relevance of each of the response contents (error icons), the user relevance system 430 may select the most relevant response contents (error icon). In some embodiments, upon determining the most relevant response contents (error icon), the user relevance system 430 may determine one or more related response contents to that response content, such as a suggested contact to learn more about the relevant response content. This is discussed in greater detail below.

Once response contents relating to the request are determined, the user relevance system 430 may share the response contents with the QA service 406. The QA service 406 may provide the request and recalled response contents to a language model 432 for generation of a response to the request. In some embodiments, the request may include the request vectors and/or the user-based vectors. The language model 432 may be or use generative artificial intelligence (AI) to generate a response. For example, the language model 432 may be a large language model, such as the language model 352, and/or the AI content generator 350. In some embodiments, the language model 432 may generate a natural language answer to the request. A natural language answer may be an answer that is phrased in the requesting user's normal vernacular or parlance.

Once the answer is generated by the language model 432, the language model 432 may transmit the answer to the QA service 406, which in turn may transmit the answer to the coordinator 408. The coordinator 408 may then transmit the answer as a response to the client device 440. In some embodiments, the response may be transmitted to the client device 440 as a response prompt. For example, the chat assistant 402 may generate a response prompt that includes the response to the request, along with additional information relating to the request, such as a suggested contact, a link, a file, a meeting invitation, a message, etc. The response prompt, along with additional information that may be included therein is described in greater detail below with respect to FIGS. 5 and 7. As noted above, in some embodiments, the response prompt may include a natural language answer to the request.

In some embodiments, the coordinator 408 may share the answer to the request with the knowledge management system 410 for storing in the knowledge bases 412A-412C. Following the above example, the knowledge management system 410 may store the answer to "what does the error icon look like?" in the knowledge base 412A associated with the design team chat channel 414A since the request was submitted in that chat channel. Since the knowledge management system 410 binds or associates the answer with the design team chat channel 414A, the answer stored in the knowledge base 412A may be bound or otherwise associated with the design team chat channel 414A for future requests.

Figure 5:
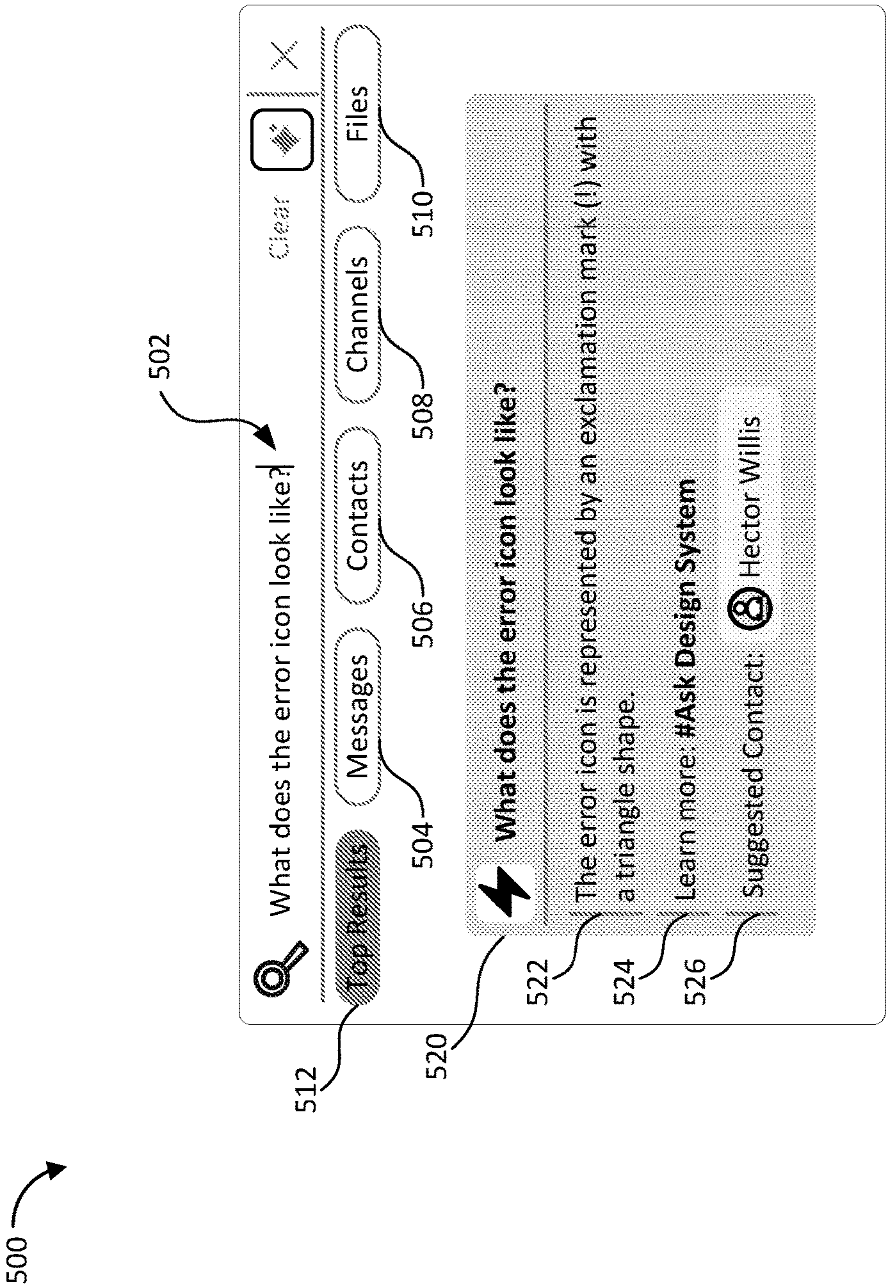
FIG. 5 illustrates an example assistant request and an example response prompt, according to an embodiment herein.

Referring now to FIGS. 5, an example prompt 500 is illustrated. The prompt 500 may illustrate a response provided to a user pursuant to submitting an assistant request to a chat assistant, as described herein. The example illustrated in FIG. 5 follows the example described above with respect to FIG. 4. As illustrated, a user may input an assistant request 502 ("request 502") into an input field. In the illustrated example, the request 502 may include the request phrase "What does the error icon look like?" From the request phrase, the chat assistant 402 may determine one or more request vectors. For example, a request vector may be "error icon." In addition to the request vectors, the chat assistant may also determine one or more user-based vectors based on the requesting user. For example, as noted above, a user-based vector may include information relating to the requesting user such as a location, a job position of the user, projects associated with the user, channels or documents the user recently or often frequents, etc. In the illustrated example, a user-based vector may be a job associated with the user, such as the user being a designer or engineer. The chat assistant 402 may also determine one or more request vectors based on the request phrase and the user-based vectors.

In some embodiments, the user may select a particular category for the chat assistant to perform the search within. For example, as illustrated, the user may search within messages 504, contacts 506, channels 508, or files 510 for results relating to the request 502. That is, if the user knows which category the response is likely within or to which category the user would like to limit the chat assistant's responses to be generated from, then the user may select a particular category and the chat assistant 402 may generate a response based on content within that category only. For example, if the user selects channels 506, then the chat assistant 402 may only generate a response based on content within the chat channels 506. A user may select more than one category and if a user wants to include all categories, then top results 512 may be selected. The top results 512 button allows the chat assistant 402 to generate responses based on content from all of the categories.

As described with respect to FIG. 4, once the response vectors and the user-based vectors are determined, the chat assistant 402 may determine response contents associated with the request 502. Using the response contents, the chat assistant 402 may generate a response prompt 520. The response prompt 520 may include a direct response 522. The direct response 522 may provide a simple, direct answer to the request 502. For example, the direct response 522 may include a natural language answer to the request 502. In addition to the direct response 522, the response prompt 520 may provide additional content, such as a 'learn more' response 524 that provides a link or content at which the user can find more information relating to the request 502. For example, the 'learn more' response 524 may provide a link to a chat channel where the user can ask further question or the 'learn more' response 524 may include a tutorial or document in which the user can read more about the direct response 522. Additionally, in some embodiments, the response prompt 520 may include a suggested contact 526. The suggested contact 526 may provide contact information to an individual, organization, or group that can provide more information relating to the request 502. For example, as illustrated, the suggested contact 526 may include the contact Hector Willis who may be a lead designer of a team associated with the requesting user. If the user has questions relating to which error icon should be used on a project headed by Hector Willis, the user can directly reach out to Hector to ask.

Figure 6:
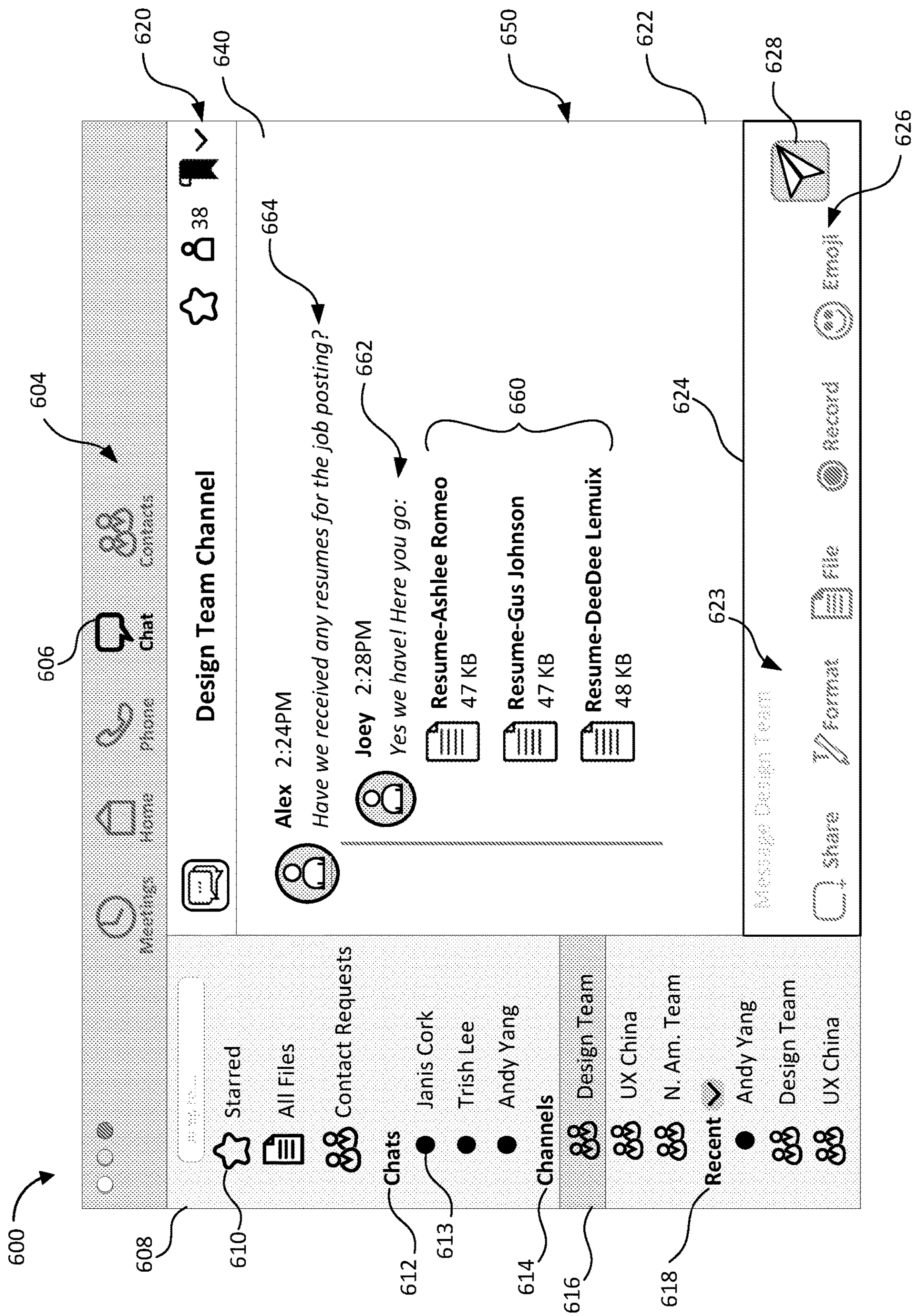
FIG. 6 illustrates an example chat channel, according to an embodiment herein.
Figure 7:
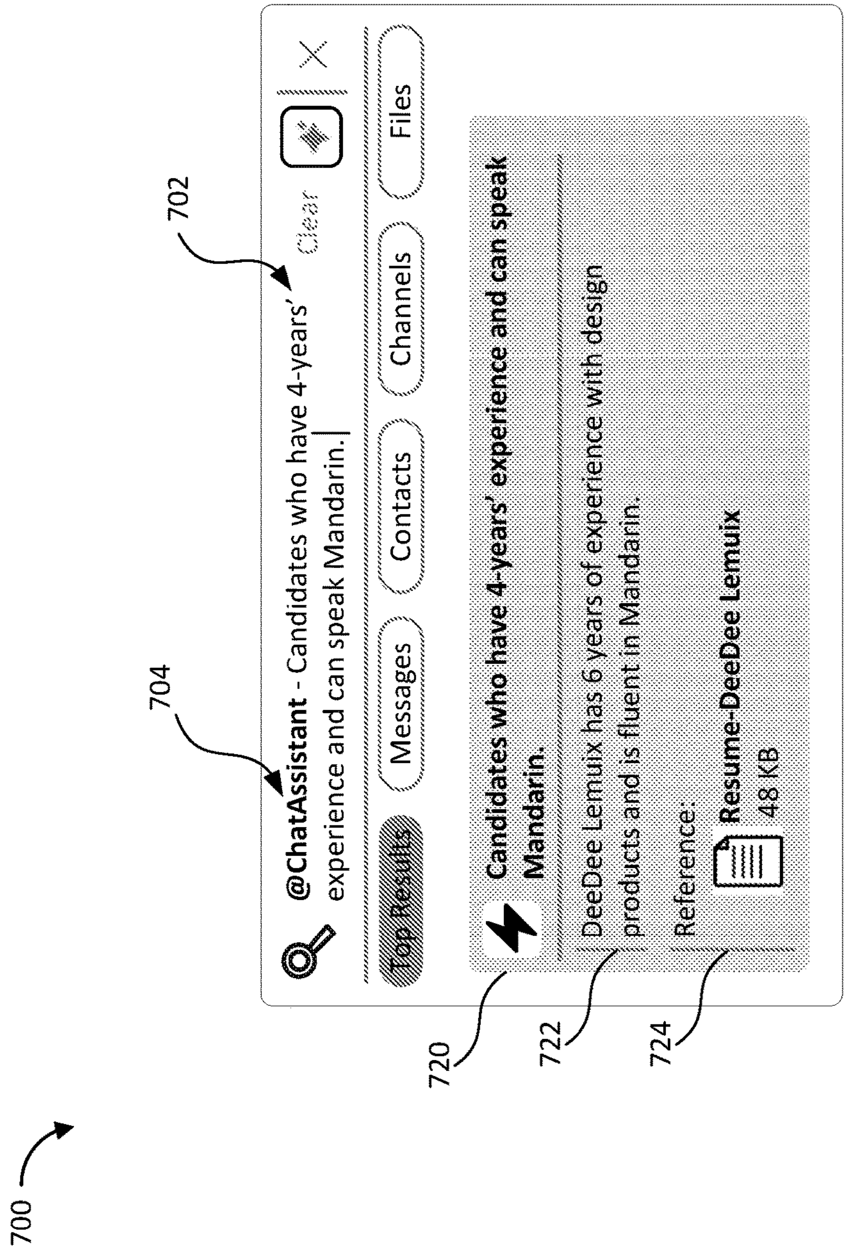
FIG. 7 illustrates another example assistant request and an example response prompt, according to an embodiment herein.

Turning now to FIGS. 6 and 7, another illustrative example is provided. Starting with FIG. 6, FIG. 6 shows a graphical user interface ("GUI") for a chat panel 600 provided as a part of client software executed by a computing device. The chat panel 600 provides access to a variety of chat functionality, including multiple chat channels 614 the user has access to. It also provides a view of an example chat channel 616, according to an embodiment herein. The chat channel 616 may be accessible through the chat panel 600 by selecting a chat channel from the available chat channels. The chat panel 600 may be displayed on a client device, such as the client device 440, in response to information sent by a communications provider, such as the communications provider 110 in FIG. 1. The chat panel 600 may be generated by an application, e.g., a standalone chat client or integrated into a video conferencing application, run by one or more processors stored on the client device.

The chat panel 600 may include a general dashboard 604, a chat control dashboard 620, a sidebar 608, a chat window 650, a reply dashboard 626, and a message composure panel 624. The general dashboard 604 may include one or more buttons or links that switch functionalities and/or views of the chat panel 600. For example, FIG. 6 shows a chat view, perhaps in response to a user command selecting a chat button 606 in the general dashboard 604. In this view, the chat window 650, the message composure panel 624, and other components illustrated in FIG. 6 may be displayed on the client device. In other examples, a contacts button may be selected by a user. In response the contacts button being selected, the chat window 650, the reply dashboard 626 and the message composure panel 624 may be replaced by a display of a contacts window including a list of user contacts associated with the user of the client device. The sidebar 608 may be displayed alongside the contacts window. Other configurations are also possible. Various buttons on the general dashboard 604 may correspond to various displays of windows being displayed on the client device. Any number of components shown in FIG. 6 may be displayed on the client device with any of the various windows. Similarly, any of the components may cease to be displayed in accordance with any of the windows.

The sidebar 608 may include one or more chat channel headings, such as chats 612, channels 614, and recent 618. Chats 612 heading may include one or more chat channels, such as chat channel 613. The chats 612 may include private chat channels, where messages in a chat channel are exchanged in a one-on-one manner. For example, the chat channel 613 may be between the member viewing the chat panel 600 and one other member, such as Janis Cork, as depicted. Messages exchanged via the chat channel 613 may only be accessible by the members of the chat channel 613. One-on-one chat channels, such as those provided under the chats 612 heading may allow members to securely communicate with each other or track communications between themselves.

The channels 614 heading may be for chat channels that include two or more users. For example, a chat channel 616 may be included under the channels 614 heading because the chat channel 616 is for a Design Team. The chat channel 616 may include two or more members who have access to send and receive messages within the chat channel 616. In some examples, the chat channel 616 may only be accessed by members who have permission to enter the chat channel 616, such as members who receive and accept an invitation to join the chat channel 616. In some embodiments, a chat channel may have a host or member who has host controls over the chat channel. For example, host controls may include the ability to establish and invite members to a chat channel.

The recent 618 heading may indicate chat channels that a viewing member of the chat panel 600 has recently viewed. The recent 618 heading may allow the viewing member easy access to commonly or recently viewed or accessed chat channels. "Recently accessed" chat channels may be determined by the client device to be a fixed number of most recent channels accessed by the viewing member or may be only those chat channels access within a certain time, calculated from the current time.

Although only the chat channel headings 612, 614, and 618 are shown, other chat channel headings are possible. For example, some examples may include a chat channel heading that displays, on the client device, only those channels that the user associated with the client device is a member of that have been recently accessed.

The sidebar 608 may also include one or more combinatory headings, such as starred combinatory heading 610. A combinatory heading may aggregate one or more messages from one or more chat channels, according to a predetermined criterion. The combinatory headings may include a link that, in response to a user command, cause the client device to display one or more messages in the chat window 650. The messages may be gathered from one or more chat channels, such as the chat channels 612 or 616, and displayed based on predetermined criteria. In FIG. 6, for example, the starred combinatory heading 610 may gather only those messages that have been marked by a user of the client device. The marked messages may be stored at the client device, and/or may be stored at the communications provider. The link may cause the one or more processors included on the client device to determine which messages are marked messages and cause them to be displayed in the chat window 650. In some examples, the link may cause the client device to send a signal to the communications provider. The communications provider may then determine which messages are marked messages and send information to the client device to generate a display of the marked messages in the chat window 650.

Other combinatory headings (and associated links and functionality) are also considered. Other examples may include an unread heading, an all files heading, a contact request heading, and others. As with the starred combinatory heading 610, an associated link may cause the client device and/or the communications provider to determine which messages (if any) meet predetermined criteria associated with the combinatory heading and subsequently display those messages on the client device.

As depicted, a viewing participant of the chat panel 600 may select to access the chat channel 616 for the Design Team. Upon selection of the chat channel 616, the chat window 650 may be provided on the chat panel 600. The chat window 650 may include the chat control dashboard 620. The chat control dashboard 620 may display one or more control buttons and/or information regarding the chat channel 616 (e.g., the currently viewed chat channel). The control buttons may include links that mark a message (e.g., to mark it such that it is determined to be a marked message via the starred combinatory heading 610), begin a video conference, schedule a meeting, create a video message, or other tasks. The chat control dashboard 620 may also include a title of the chat channel 616 currently being displayed on the client device, such as the "Design Team Channel" as depicted, and/or a number of users with access to the chat channel 616. One of ordinary skill in the art would recognize many different possibilities and configurations.

The chat window 650 may also include a message composure panel 624. The message composure panel 624 may include an input field 623, where the member can input a message and select to send the message to the chat channel 616. The input field 623 may be accessed by a peripheral device such as a mouse, a keyboard, a stylus, or any other suitable input method. In some examples, the input field 623 may be accessed by a touchscreen or other system built into the client device. In some examples, a notification may be sent from the client device and/or the communications provider that indicates a response is being entered into the input field 623 by the user. In other examples, no notification may be sent.

The reply dashboard 626 may include one or more buttons that, in response to a user command edit or modify a response input into the input field 623. For example, a record button may be provided, that allows the client device to capture audio and video. In other examples, there may be a share button that causes the client device to send the message to a different chat channel. In yet another example, there may be a reaction button that causes an image to be sent by the client device to the chat channel in response to a message posted in the chat channel.

In some examples, there may be one or more formatting buttons included on the reply dashboard 626. The one or more formatting buttons may change the appearance of a reply entered in the input field 623. The user may thereby edit and customize their response in the input field 623 before sending.

The reply dashboard 626 may include a send button 628. The send button 628 may, in response to a user command, cause the client device to send the contents of the input field 623 (or "message") to the other members of the chat channel 616. The client device may transmit the message to the communications provider 110, which may in turn transmit the message to the client devices associated with the other members of the chat channel 616. Upon transmission of the message via the send button 628, the message may be published within a chat messaging panel 622. As noted above, messages exchanged within the chat channel 616 may include image files, such as JPEG, PNG, TIFF, or files in any other suitable format, may also include video files such as MPEG, GIF, or video files in any other suitable format, or may also include text entered into the input field 623 and/or other files attached to the message such as a PDF, DOC, or other file format.

As illustrated, the chat window 650 may include the chat messaging panel 622. The chat messaging panel 622 may display messages as they are exchanged between members of the chat channel 616. The messages may be displayed in the chat messaging panel 622 in real-time. The chat messaging panel 622 may include all messages that are exchanged within the chat channel 616 since the generation of the chat channel 616. As could be appreciated, by holding all messages that are exchanged between members of the chat channel 616, the chat messaging panel 622 may include a large volume of messages. Not only could a large volume of messages be generated if the chat channel 616 is active for a long duration of time or includes a large number of members, but also if the members of the chat channel 616 are increasingly communicative.

For example, the viewing user may receive three resumes 660 in chat message 662 via the chat channel 616. The resumes 660 may be shared in the chat channel 616 responsive to a question 664 posted in the chat channel 616. After additional messages (not shown) are exchanged in the chat channel 616, the resumes 660 may be lost in the message exchanges and be difficult to find at a later date. Accordingly, the chat assistant functionality, as described herein, may allow for easy and swift identification and surfacing of the resumes 660. Moreover, the chat assistant functionality may extract the information of the resumes 660 and be able to directly respond to a request involving the resumes 660.

Turning now to FIG. 7, such an example is described. That is, FIG. 7 illustrates a prompt 700 in which the chat assistant functionality is queried for an assistant request 702 ("request 702"). The request 702 is for "candidates who have 4-years' experience and can speak Mandarin." As illustrated, the chat assistant functionality may be queried by a call 702 which invokes the chat assistant functionality, such as the chat assistant functionality 400 of FIG. 4.

As illustrated, the chat assistant, such as the chat assistant 402, may generate a response prompt 720 responsive to the request 702. To generate the response prompt 720, the chat assistant may identify the resumes 660 from the chat channel 616 and extract the content within the resumes 660. Identification of the resumes 660 in the chat channel 616 may be based on user-based vectors corresponding to the requesting client device. From the user-based vectors and the request vectors associated with the request 702, the chat assistant may determine that the resume corresponding to DeeDee Lemuix is the most relevant response contents for the request 702. As such, the response prompt 720 may include the direct response 722 that answers the request 702, identifying DeeDee Lemuix as a candidate who most closely matches the request 702. In addition to the direct response 722, the request prompt 720 may include additional content 724, such as the resume for DeeDee Lemuix.

Figure 8:
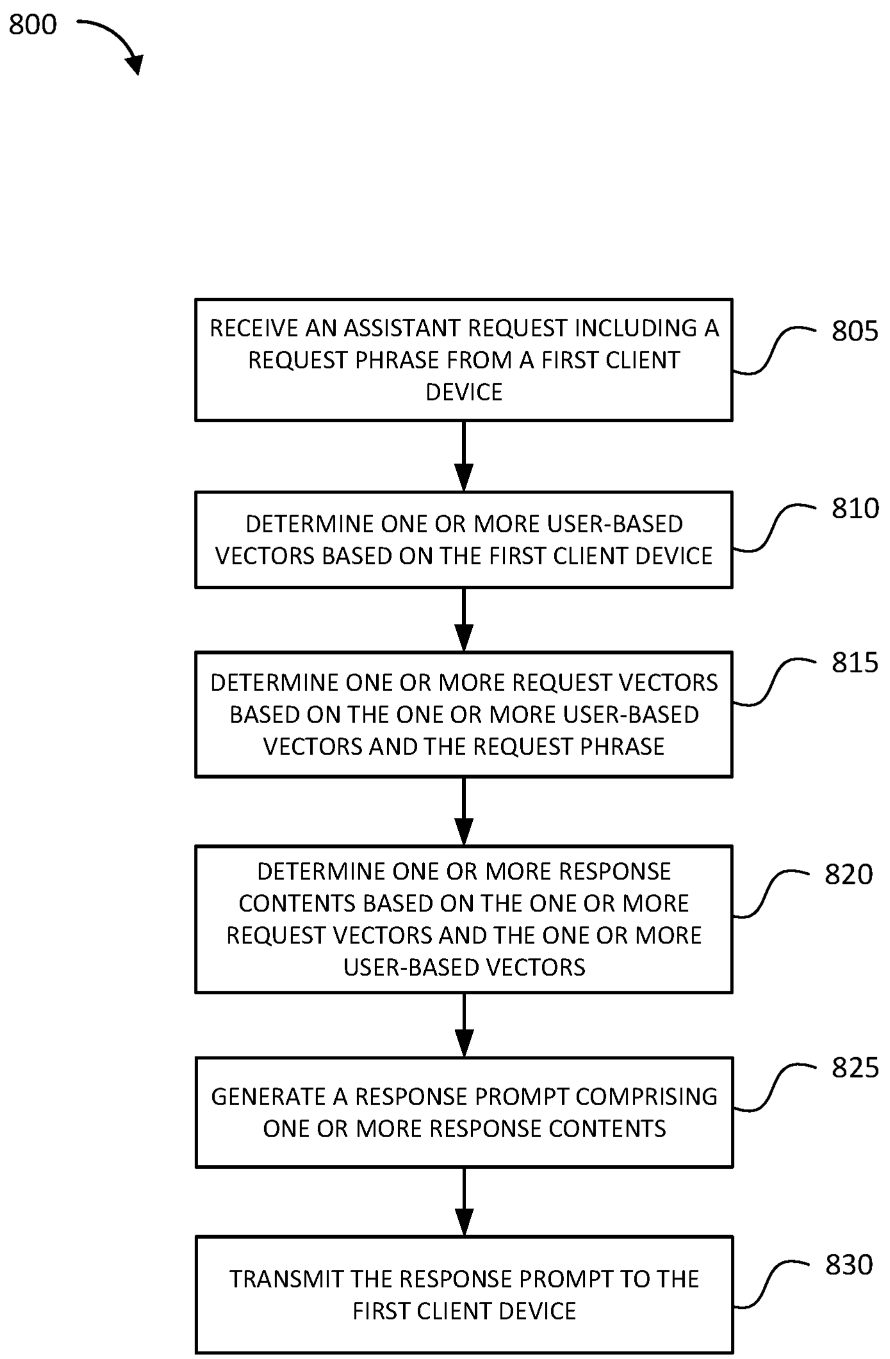
FIG. 8 illustrates an exemplary method for providing chat assistant functionality, according to an embodiment herein.

Referring now to FIG. 8, a flowchart of an example method 800 for providing a chat assistant functionality is provided. The description of the method 800 in FIG. 8 will be made with reference to FIGS. 1-7.

The method 800 may include steps 805 and 810. At step 805, a communications provider 110 via a chat assistant, such as the chat assistant 402, receives an assistant request including a request phrase from a first client device. A user may input the assistant request via GUI on the first client device (e.g., client device 140, 150, or 160) to the communications provider 110. As described above, the assistant request may be submitted via a chat channel, text message, email, phone call, during a video conference, or via an independent application.

Once the chat assistant receives the assistant request, the chat assistant may determine one or more user-based vectors at step 810. The user-based vectors may be determined based on the first client device. That is, the user-based vectors may be determined based on a user associated with the first client device. For example, a user may login or otherwise have a profile associated with the first client device. The user-based vectors may be determined based on the user, the user's profile, or the client device that the user is using, such as to determine a location, such as an office or place of business, an organization, a job title or position, a group or chat channel frequented or associated with the user/client device, a contact, a physical location of the first client device, or a previous assistant request submitted by the user or the first client device.

At step 815, the chat assistant may determine one or more request vectors based on the request phrase and the user-based vectors. Then at step 820, the chat assistant may determine one or more response contents based on the request vectors and the user-based vectors. As described above, the response contents may include at least one of a contact, text within a chat channel, a document, an email, or a meeting. In some embodiments, prior to determining the response contents, the method may include determining one or more resources based on the user-based vectors and the request vectors. For example, a messaging application may be identified based on the user-based vectors and the request vectors. In such cases, the response contents may then be determined based on the resources. Following the preceding example, a message (e.g., response contents) relevant to the assistant request may then be determined within the messaging application based on the user-based vectors and then the request vectors. In other words, in some embodiments, the user-based vectors and the request vectors may be used to first determine a resource and then determine a response content within the resource.

In some embodiments, the method may include extracting, by the chat assistant, response contents from a plurality of resources. The extracted response contents may then be indexed by the chat assistant in an indexing system, such as index system 404. In some cases, the response contents may be associated, by the chat assistant, with one or more user-based vectors. This can allow for easy and fast identification of response contents pursuant to future assistant requests.

In some embodiments, to determine, by the chat assistant, the response contents based on the request vectors and the user-based vectors, the chat assistant may determine a plurality of response contents based on the request vectors. The chat assistant may then determine a relevancy of each of the plurality of response contents to the first client device based on the user-based vectors. Then, the chat assistant may select the one or more response contents from the plurality of response contents based on the relevancy of each of the response contents to the first client device.

At step 825, the chat assistant may generate a response prompt including the response contents, such as the response prompt 520 or 720. In some embodiments, the chat assistant may query a knowledge management system, such as the knowledge management system 410, for input on the assistant request. In some cases, the chat assistant may receive input from the knowledge management system on the assistant request. In such a case, the chat assistant may generate the response prompt based, in part, on input from the knowledge management system.

In other embodiments, upon querying the knowledge management system, the chat assistant may receive a no-result indication form the knowledge management system. This may mean that there is no relevant response contents identified within the knowledge management system for the provided assistant request (e.g., the user-based vectors or request vectors). In such cases, after response contents are determined by the chat assistant, the chat assistant may transmit the response contents associated with the assistant request to the knowledge management system.

In some embodiments, generating the response prompt may include submitting, by the chat assistant, the assistant request and the one or more response contents to a language model and receiving, by the chat assistant, the response prompt from the language model. In some cases, the response prompt includes a natural language answer to the assistant request. Optionally, generating the response prompt may include providing, by the chat assistant, a link to the one or more resources associated with the response contents on the response prompt or providing content from a resource associated with the response contents in the response prompt. For example, step 825 may include determining, by the chat assistant, content within a chat channel associated with the response contents providing, by the chat assistant, the content from the chat channel associated with the response contents in the response prompt. In another example, step 825 may include extracting, by the chat assistant, the response contents from resources and determining, by the chat assistant, a document within the response contents associated with the response vectors. The document may then be transmitted by the chat assistant to the first client device as part of the response prompt. In yet another example, step 825 may include determining, by the chat assistant, a suggested contact associated with the response contents and providing, by the chat assistant, a contact information for the suggested contact associated with the response contents in the response prompt.

After the response prompt is generated, the chat assistant, via the communications provider, may transmit the response prompt to the first client device, at step 830. In some embodiments, the method 800 may also include associating a first response content of the response contents with a first user-based vector of the user-based vectors, identifying, by the chat assistant, the first user-based vector in the assistant request, and determining, by the chat assistant, the first response content based on the first user-based vector.

Figure 9:
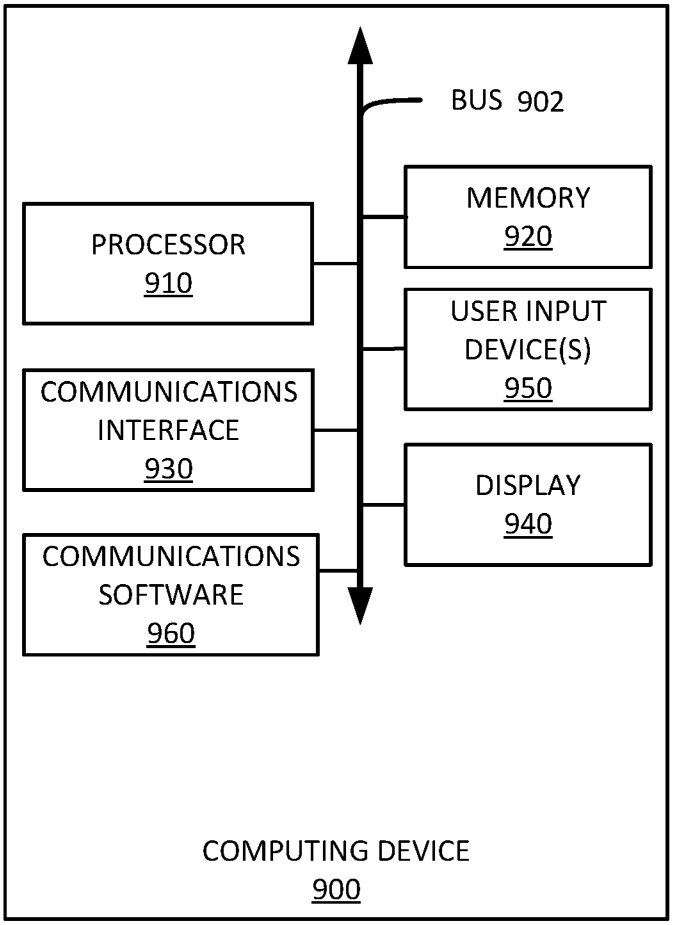
FIG. 9 shows an example computing device suitable for providing chat assistant functionality, according to this disclosure.

Referring now to FIG. 9, FIG. 9 shows an example computing device 900 suitable for use in example systems or methods for providing the chat assistant functionalities, as described herein. The example computing device 900 includes a processor 910 which is in communication with the memory 920 and other components of the computing device 900 using one or more communications buses 902. The processor 910 is configured to execute processor-executable instructions stored in the memory 920 to perform one or more methods for providing a chat assistant functionality, such as part or all of the example method 800, described above with respect to FIG. 8. For example, communications software 960 provided on the computing device 900 may provide instructions for performing one or more steps of the method 800 for providing a chat assistant functionality. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method comprising: receiving, by a communications provider via a chat assistant, an assistant request comprising a request phrase from a first client device; determining, by the chat assistant, one or more user-based vectors based on the first client device; determining, by the chat assistant, one or more request vectors based on the request phrase and the one or more user-based vectors; determining, by the chat assistant, one or more response contents based on the one or more request vectors and the one or more user-based vectors; generating, by the chat assistant, a response prompt comprising one or more of the response contents; and transmitting, by the chat assistant via the communications provider to the first client device, the response prompt.

Example 2 is the method of any previous or subsequent Example, wherein determining, by the chat assistant, the one or more response contents based on the one or more request vectors and the one or more user-based vectors further comprises: determining, by the chat assistant, a plurality of response contents based on the one or more request vectors; determining, by the chat assistant, a relevancy of each of the plurality of response contents to the first client device based on the one or more user-based vectors; and selecting, by the chat assistant, the one or more response contents from the plurality of response contents based on the relevancy of each response contents to the first client device.

Example 3 is the method of any previous or subsequent Example, wherein generating, by the chat assistant, the response prompt comprising the one or more of the response contents comprises: submitting, by the chat assistant, the assistant request and the one or more response contents to a language model; and receiving, by the chat assistant, the response prompt from the language model, wherein the response prompt comprises a natural language answer to the assistant request.

Example 4 is the method of any previous or subsequent Example, wherein generating, by the chat assistant, the response prompt comprising the one or more response contents further comprises providing, by the chat assistant, a link to the one or more resources associated with the response contents on the response prompt.

Example 5 is the method of any previous or subsequent Example, wherein the one or more response contents comprises at least one of: a contact; text within a chat channel; a document; an email; or a meeting.

Example 6 is the method of any previous or subsequent Example, further comprising: associating a first response content of the one or more response contents with a first user-based vector of the one or more user-based vectors; identifying, by the chat assistant, the first user-based vector in the assistant request; and determining, by the chat assistant, the first response content based on the first user-based vector.

Example 7 is the method of any previous or subsequent Example, wherein generating, by the chat assistant, the response prompt comprising the one or more response contents further comprises: determining, by the chat assistant, content within a chat channel associated with the response contents; and providing, by the chat assistant, the content from the chat channel associated with the response contents in the response prompt.

Example 8 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, by a communications provider via a chat assistant, an assistant request comprising a request phrase from a first client device; determine, by the chat assistant, one or more user-based vectors based on the first client device; determine, by the chat assistant, one or more request vectors based on the request phrase and the one or more user-based vectors; determine, by the chat assistant, one or more response contents based on the one or more request vectors and the one or more user-based vectors; generate, by the chat assistant, a response prompt comprising one or more of the response contents; and transmit, by the chat assistant via the communications provider, to the first client device, the response prompt.

Example 9 is the system of any previous or subsequent Example, wherein the processor is further configured to execute processor-executable instructions stored in the non-transitory computer-readable medium to: determine one or more resources based on the one or more user-based vectors and the one or more request vectors.

Example 10 is the system of any previous or subsequent Example, wherein the processor is further configured to execute processor-executable instructions stored in the non-transitory computer-readable medium to: query, by the chat assistant, a knowledge management system for input on the assistant request; receive, by the chat assistant, the input on the assistant request; and generate, by the chat assistant, the response prompt based, in part, on the input from the knowledge management system.

Example 11 is the system of any previous or subsequent Example, wherein the processor is further configured to execute processor-executable instructions stored in the non-transitory computer-readable medium to: query, by the chat assistant, a knowledge management system for input on the assistant request; receive, by the chat assistant, a no-result indication from the knowledge management system; and transmit, by the chat assistant, the one or more response contents associated with the assistant request to the knowledge management system.

Example 12 is the system of any previous or subsequent Example, wherein the processor is further configured to execute processor-executable instructions stored in the non-transitory computer-readable medium to: extract, by the chat assistant, the one or more response contents from a plurality of resources; index, by the chat assistant, the one or more response contents from the plurality of resources in an indexing system; and associate, by the chat assistant, the one or more response contents with the one or more user-based vectors.

Example 13 is the system of any previous or subsequent Example, wherein the processor-executable instructions to generate, by the chat assistant, the response prompt comprising the one or more response contents further comprise processor-executable instructions to: determine, by the chat assistant, a suggested contact associated with the response contents; and provide, by the chat assistant, a contact information for the suggested contact associated with the response contents in the response prompt.

Example 14 is the system of any previous or subsequent Example, wherein the processor-executable instructions to determine, by the chat assistant, one or more user-based vectors based on the first client device further comprise processor-executable instructions to determine one or more of: a location associated with the first client device; an organization associated with the first client device; a job title of a user associated with the first client device; a group associated with the first client device; a chat channel associated with the first client device; a contact associated with the first client device; a physical location of the first client device; and a previous assistant request associated with the first client device.

Example 15 is a non-transitory computer-readable medium comprising processor-executable instructions configured to cause one or more processors to: receive, by a communications provider via a chat assistant, an assistant request comprising a request phrase from a first client device; determine, by the chat assistant, one or more user-based vectors based on the first client device; determine, by the chat assistant, one or more request vectors based on the request phrase and the one or more user-based vectors; determine, by the chat assistant, one or more response contents based on the one or more request vectors and the one or more user-based vectors; generate, by the chat assistant, a response prompt comprising one or more of the response contents; and transmit, by the chat assistant via the communications provider, to the first client device, the response prompt.

Example 16 is the non-transitory computer-readable medium of any previous or subsequent Example, wherein the processor-executable instructions for generating, by the chat assistant, the response prompt comprising the one or more of the response contents further comprise process-executable instructions to cause the one or more processors to: submit, by the chat assistant, the assistant request and the one or more response contents to a language model; and receive, by the chat assistant, the response prompt from the language model, wherein the response prompt comprises a natural language answer to the assistant request.

Example 17 is the non-transitory computer-readable medium of any previous or subsequent Example, wherein the processor-executable instructions for determining, by the chat assistant, the one or more response contents based on the one or more request vectors and the one or more user-based vectors further comprise process-executable instructions to cause the one or more processors to: determine, by the chat assistant, a plurality of response contents based on the one or more request vectors; determine, by the chat assistant, a relevancy of each of the plurality of response contents to the first client device based on the one or more user-based vectors; and select, by the chat assistant, the one or more response contents from the plurality of response contents based on the relevancy of each response contents to the first client device.

Example 18 is the non-transitory computer-readable medium of any previous or subsequent Example, wherein the processor-executable instructions stored in the non-transitory computer-readable medium are further configured to cause the one or more processors to: extract, by the chat assistant, the one or more response contents from a plurality of resources; and determine, by the chat assistant, a document within the one or more response contents associated with the one or more response vectors.

Example 19 is the non-transitory computer-readable medium of any previous or subsequent Example, wherein the processor-executable instructions for generating, by the chat assistant, the response prompt comprising the one or more response contents further comprise process-executable instructions to cause the one or more processors to: transmit, by the chat assistant, the document associated with the one or more response vectors to the first client device as part of the response prompt.

Example 20 is the non-transitory computer-readable medium of any previous or subsequent Example, wherein the processor-executable instructions stored in the non-transitory computer-readable medium are further configured to cause the one or more processors to: associate a first response content with one of the one or more response contents with a first user-based vector of the one or more user-based vectors; identify, by the chat assistant, the first user-based vector in the assistant request; and determine, by the chat assistant, the first response content based on the first user-based vector.

The invention claimed is:

1. A method comprising:

receiving, by a communications provider via a chat assistant, an assistant request comprising a request phrase from a first client device, the request phrase identifying information to be obtained from a repository;

determining, by the chat assistant, one or more user-based vectors based on the first client device;

determining, by the chat assistant, one or more request vectors based on the request phrase and the one or more user-based vectors;

identifying, by the chat assistant, one or more existing response contents comprising the information to be obtained from the repository based on the one or more request vectors and the one or more user-based vectors;

generating, by the chat assistant, a response prompt based on one or more of the existing response contents; and transmitting, by the chat assistant via the communications provider to the first client device, the response prompt.

2. The method of claim 1, wherein determining, by the chat assistant, the one or more existing response contents based on the one or more request vectors and the one or more user-based vectors further comprises:

determining, by the chat assistant, a plurality of response contents based on the one or more request vectors;

determining, by the chat assistant, a relevancy of each of the plurality of response contents to the first client device based on the one or more user-based vectors; and selecting, by the chat assistant, the one or more existing response contents from the plurality of response contents based on the relevancy of each response contents to the first client device.

3. The method of claim 1, wherein generating, by the chat assistant, the response prompt comprising the one or more of the existing response contents comprises:

submitting, by the chat assistant, the assistant request and the one or more existing response contents to a language model; and receiving, by the chat assistant, the response prompt from the language model, wherein the response prompt comprises a natural language answer to the assistant request.

4. The method of claim 1, wherein generating, by the chat assistant, the response prompt comprising the one or more existing response contents further comprises providing, by the chat assistant, a link to the one or more resources associated with the existing response contents on the response prompt.

5. The method of claim 1, wherein the one or more existing response contents comprises at least one of:

a contact;

text within a chat channel;

a document;

an email; or a meeting.

6. The method of claim 1, further comprising:

associating a first response content of the one or more existing response contents with a first user-based vector of the one or more user-based vectors;

identifying, by the chat assistant, the first user-based vector in the assistant request; and determining, by the chat assistant, the first response content based on the first user-based vector.

7. The method of claim 1, wherein generating, by the chat assistant, the response prompt comprising the one or more existing response contents further comprises:

determining, by the chat assistant, content within a chat channel associated with the one or more of the existing response contents; and providing, by the chat assistant, the content from the chat channel associated with the one or more of the existing response contents in the response prompt.

8. A system comprising:

a non-transitory computer-readable medium;

a communications interface; and a processor communicatively coupled to the non-transitory computer-readable medium and the communications interface, the processor configured to execute processor-executable instructions stored in the non-transitory computer-readable medium to:

receive, by a communications provider via a chat assistant, an assistant request comprising a request phrase from a first client device, the request phrase identifying information to be obtained from a repository;

determine, by the chat assistant, one or more user-based vectors based on the first client device;

determine, by the chat assistant, one or more request vectors based on the request phrase and the one or more user-based vectors;

identifying, by the chat assistant, one or more existing response contents comprising the information to be obtained from the repository based on the one or more request vectors and the one or more user-based vectors;

generate, by the chat assistant, a response prompt based on one or more of the response contents; and transmit, by the chat assistant via the communications provider, to the first client device, the response prompt.

9. The system of claim 8, wherein the processor is further configured to execute processor-executable instructions stored in the non-transitory computer-readable medium to:

determine one or more resources based on the one or more user-based vectors and the one or more request vectors.

10. The system of claim 8, wherein the processor is further configured to execute processor-executable instructions stored in the non-transitory computer-readable medium to:

query, by the chat assistant, a knowledge management system for input on the assistant request;

receive, by the chat assistant, the input on the assistant request; and generate, by the chat assistant, the response prompt based, in part, on the input from the knowledge management system.

11. The system of claim 8, wherein the processor is further configured to execute processor-executable instructions stored in the non-transitory computer-readable medium to:

query, by the chat assistant, a knowledge management system for input on the assistant request;

receive, by the chat assistant, a no-result indication from the knowledge management system; and transmit, by the chat assistant, the one or more existing response contents associated with the assistant request to the knowledge management system.

12. The system of claim 8, wherein the processor is further configured to execute processor-executable instructions stored in the non-transitory computer-readable medium to:

extract, by the chat assistant, the one or more existing response contents from a plurality of resources;

index, by the chat assistant, the one or more existing response contents from the plurality of resources in an indexing system; and associate, by the chat assistant, the one or more existing response contents with the one or more user-based vectors.

13. The system of claim 8, wherein the processor-executable instructions to generate, by the chat assistant, the response prompt comprising the one or more existing response contents further comprise processor-executable instructions to:

determine, by the chat assistant, a suggested contact associated with the one or more of the existing response contents; and provide, by the chat assistant, a contact information for the suggested contact associated with the one or more of the existing response contents in the response prompt.

14. The system of claim 8, wherein the processor-executable instructions to determine, by the chat assistant, one or more user-based vectors based on the first client device further comprise processor-executable instructions to determine one or more of:

a location associated with the first client device;

an organization associated with the first client device;

a job title of a user associated with the first client device;

a group associated with the first client device;

a chat channel associated with the first client device;

a contact associated with the first client device;

a physical location of the first client device; and a previous assistant request associated with the first client device.

15. A non-transitory computer-readable medium comprising processor-executable instructions configured to cause one or more processors to:

receive, by a communications provider via a chat assistant, an assistant request comprising a request phrase from a first client device, the request phrase identifying information to be obtained from a repository;

determine, by the chat assistant, one or more user-based vectors based on the first client device;

determine, by the chat assistant, one or more request vectors based on the request phrase and the one or more user-based vectors;

identifying, by the chat assistant, one or more existing response contents comprising the information to be obtained from the repository based on the one or more request vectors and the one or more user-based vectors;

generate, by the chat assistant, a response prompt based on one or more of the existing response contents; and transmit, by the chat assistant via the communications provider, to the first client device, the response prompt.

16. The non-transitory computer-readable medium of claim 15, wherein the processor-executable instructions for generating, by the chat assistant, the response prompt comprising the one or more of the existing response contents further comprise process-executable instructions to cause the one or more processors to:

submit, by the chat assistant, the assistant request and the one or more existing response contents to a language model; and receive, by the chat assistant, the response prompt from the language model, wherein the response prompt comprises a natural language answer to the assistant request.

17. The non-transitory computer-readable medium of claim 15, wherein the processor-executable instructions for determining, by the chat assistant, the one or more existing response contents based on the one or more request vectors and the one or more user-based vectors further comprise process-executable instructions to cause the one or more processors to:

determine, by the chat assistant, a plurality of response contents based on the one or more request vectors;

determine, by the chat assistant, a relevancy of each of the plurality of response contents to the first client device based on the one or more user-based vectors; and select, by the chat assistant, the one or more existing response contents from the plurality of response contents based on the relevancy of each response contents to the first client device.

18. The non-transitory computer-readable medium of claim 15, wherein the processor-executable instructions stored in the non-transitory computer-readable medium are further configured to cause the one or more processors to:

extract, by the chat assistant, the one or more existing response contents from a plurality of resources; and determine, by the chat assistant, a document within the one or more existing response contents associated with the one or more response vectors.

19. The non-transitory computer-readable medium of claim 18, wherein the processor-executable instructions for generating, by the chat assistant, the response prompt comprising the one or more existing response contents further comprise process-executable instructions to cause the one or more processors to:

transmit, by the chat assistant, the document associated with the one or more response vectors to the first client device as part of the response prompt.

20. The non-transitory computer-readable medium of claim 15, wherein the processor-executable instructions stored in the non-transitory computer-readable medium are further configured to cause the one or more processors to:

associate a first response content with one of the one or more existing response contents with a first user-based vector of the one or more user-based vectors;

identify, by the chat assistant, the first user-based vector in the assistant request; and determine, by the chat assistant, the first response content based on the first user-based vector.

* * * * *